(12) United States Patent
Lim et al.

(10) Patent No.: US 12,090,915 B2
(45) Date of Patent: Sep. 17, 2024

(54) LAMP FOR VEHICLE

(71) Applicant: SL Corporation, Daegu (KR)

(72) Inventors: Gyosung Lim, Gyeongsan-si (KR);
Changkyung Yun, Gyeongsan-si (KR);
Jihye Kim, Gyeongsan-si (KR);
Jaeseok Jo, Gyeongsan-si (KR);
Wanpyo Hong, Gyeongsan-si (KR)

(73) Assignee: SL Corporation, Daegu (KR)

( * ) Notice: Subject to any disclaimer, the term of this patent is extended or adjusted under 35 U.S.C. 154(b) by 112 days.

(21) Appl. No.: 17/960,612

(22) Filed: Oct. 5, 2022

(65) Prior Publication Data
US 2023/0166650 A1 Jun. 1, 2023

(30) Foreign Application Priority Data
Nov. 30, 2021 (KR) ........................ 10-2021-0168787

(51) Int. Cl.
| | | |
|---|---|---|
| B60Q 1/22 | (2006.01) | |
| B60Q 1/50 | (2006.01) | |
| F21S 43/20 | (2018.01) | |
| F21S 43/30 | (2018.01) | |

(52) U.S. Cl.
CPC ............... B60Q 1/22 (2013.01); B60Q 1/50 (2013.01); F21S 43/26 (2018.01); F21S 43/30 (2018.01)

(58) Field of Classification Search
CPC .. F21S 43/30; F21S 43/26; B60Q 1/22; B60Q 1/50
USPC ........................................... 340/468
See application file for complete search history.

(56) References Cited

U.S. PATENT DOCUMENTS

| | | | |
|---|---|---|---|
| 8,979,334 B2* | 3/2015 | Yamazaki | B60Q 1/085 362/465 |
| 10,400,975 B1* | 9/2019 | Bushre | G02B 19/0066 |
| 11,391,432 B1* | 7/2022 | Kang | F21S 43/14 |
| 2005/0018442 A1* | 1/2005 | Kim | F21V 11/16 362/517 |
| 2008/0112177 A1* | 5/2008 | Kuwahara | B60Q 1/12 362/512 |
| 2012/0140502 A1* | 6/2012 | Lee | F21S 41/689 362/512 |
| 2013/0039080 A1* | 2/2013 | Yamazaki | F21S 41/698 362/465 |
| 2013/0107559 A1* | 5/2013 | Gava | F21S 41/645 362/539 |
| 2014/0063833 A1* | 3/2014 | Park | F21S 41/143 362/520 |
| 2015/0023043 A1* | 1/2015 | Yang | B60Q 1/50 362/521 |
| 2015/0260366 A1* | 9/2015 | Youn | F21S 41/689 362/512 |
| 2016/0003438 A1* | 1/2016 | Kim | F21S 41/63 362/516 |
| 2018/0066823 A1* | 3/2018 | Chou | F21S 41/255 |
| 2018/0180243 A1* | 6/2018 | Na | F21S 41/68 |

(Continued)

*Primary Examiner* — Zhen Y Wu
(74) *Attorney, Agent, or Firm* — United One Law Group LLC; Kongsik Kim; Jhongwoo Peck

(57) ABSTRACT

A lamp for vehicle includes a light source unit that generates light, a shield unit that selectively transmits a portion of the light of the light source unit, and a lens unit that concentrates the light transmitted through the shield unit to a road surface. The shield unit includes at least one protrusion member that protrudes outwardly from a surface of the shield unit.

19 Claims, 27 Drawing Sheets

(56) References Cited

U.S. PATENT DOCUMENTS

| | | | | |
|---|---|---|---|---|
| 2019/0113197 | A1* | 4/2019 | Kamiya | F21S 43/14 |
| 2019/0322209 | A1* | 10/2019 | Sugiyama | F21S 43/26 |
| 2019/0366923 | A1* | 12/2019 | Chen | B60R 1/06 |
| 2020/0141553 | A1* | 5/2020 | Han | F21S 41/24 |
| 2020/0180504 | A1* | 6/2020 | Kim | F21S 41/285 |
| 2020/0207257 | A1* | 7/2020 | Choi | B60Q 11/007 |
| 2020/0217477 | A1* | 7/2020 | Nicholson | B60Q 1/2696 |
| 2021/0164631 | A1* | 6/2021 | Niu | F21S 41/16 |
| 2021/0199262 | A1* | 7/2021 | Lee | B60Q 1/0035 |
| 2021/0263301 | A1* | 8/2021 | Oshima | G03B 21/147 |
| 2021/0302704 | A1* | 9/2021 | Long | G02B 7/028 |
| 2021/0367116 | A1* | 11/2021 | Eom | F21S 43/145 |
| 2022/0170604 | A1* | 6/2022 | Jin | G02B 19/0047 |
| 2022/0371509 | A1* | 11/2022 | Okubo | B60Q 1/50 |

* cited by examiner (a)

(b)

LAMP FOR VEHICLE

CROSS-REFERENCE TO RELATED APPLICATION

This application claims priority from Korean Patent Application No. 10-2021-0168787, filed on Nov. 30, 2021, which application is incorporated herein by reference in its entirety.

BACKGROUND

1 Technical Field

The present disclosure relates to a vehicle lamp, and more particularly, to a vehicle lamp that forms a rear road surface pattern when the vehicle proceeds in reverse.

2. Description of the Related Art

In general, a vehicle is provided with a lamp for the purpose of an illumination function for easily identifying an object located around the vehicle during low light conditions (e.g., night driving) and a signaling function for notifying other vehicles or road users of the driving state of the vehicle.

For example, a headlamp secures the driver's field of vision by irradiating light to the front, a brake lamp is turned on when the brake is applied, a direction indicator lamp is used when turning right or left, and a reversing lamp is turned on when reversing. There are vehicle lamps that operate by directly emitting light using the lamp, and in addition, there are also reflector types mounted on the front and/or rear that function by reflecting light so that the vehicle can be easily recognized from the outside.

Among them, the reversing lamp is turned on when the vehicle proceeds in reverse to secure the driver's night vision or to notify other vehicles that the vehicle is reversing.

SUMMARY

An object of the present disclosure is to provide a vehicle lamp that forms a road surface pattern at the rear of the vehicle when the vehicle moves backwards.

According to an aspect of the present disclosure, a lamp for vehicle may include a light source unit that generates light, a shield unit that selectively transmits a portion of the light generated from the light source unit, and a lens unit that concentrates the light transmitted through the shield unit on a road surface. The shield unit may include at least one protrusion member that outwardly protrudes from a surface of the shield unit.

In some embodiments, the at least one protrusion member may include a plurality of protrusion members provided on the surface of the shield unit, and the plurality of protrusion members may have a same protrusion length from the surface of the shield unit. In some embodiments, the at least one protrusion member may be extended laterally to be connected through different regions of the surface of the shield unit. For example, the at least one protrusion member may include a base shape that is substantially curvilinear (e.g., a closed loop) having a predetermined width, and the at least one protrusion member may have a substantially constant protrusion length from the surface of the shield unit.

The shield unit may be made of a glass material.

Among the light transmitted through the shield unit, a main transmitted light may form a plurality of road surface patterns, and an auxiliary transmitted light may be irradiated to at least one selected road surface pattern among the plurality of road surface patterns to enhance a brightness of the light in the selected road surface pattern. In some such embodiments, the shield unit may include at least one main transmission aperture for forming the main transmitted light, and at least one auxiliary transmission aperture for forming the auxiliary transmitted light. The at least one main transmission aperture may include a plurality of main transmission apertures, which may be arranged at different heights with respect to the road surface, and a shape and/or a size of each of the plurality of main transmission apertures may be determined to allow the plurality of road surface patterns to have substantially same shape and size. Some of the plurality of main transmission apertures may be arranged linearly along an imaginary line, and some others of the plurality of main transmission apertures may be arranged to be separated from the imaginary line. For example, a main transmission aperture having a largest size among the plurality of main transmission apertures may be arranged to be separated from the imaginary line.

The light source unit may include a main light source unit corresponding to the main transmission aperture, and an auxiliary light source unit corresponding to the auxiliary transmission aperture. In some such embodiments, each of the main light source unit and the auxiliary light source unit may include a light source that generates the light, and an optical unit that allows the light of the light source to be irradiated with straightness in one direction. The optical unit may have a size corresponding to a size of a corresponding main transmission aperture or a corresponding auxiliary transmission aperture.

The auxiliary transmitted light may be irradiated to a road surface pattern among the plurality of road surface patterns, which, without the auxiliary transmitted light, would have a lower brightness than adjacent road surface patterns.

A main transmitted light among the light transmitted through the shield unit may form a plurality of road surface patterns, in which the light is concentrated on different regions, and an auxiliary transmitted light among the light transmitted through the shield unit may be irradiated to concentrate the light to at least one selected region among the plurality of road surface patterns to enhance a brightness of the selected region. In some such embodiments, the shield unit may include a main transmission aperture for forming the main transmitted light, and an auxiliary transmission aperture for forming the auxiliary transmitted light. The main transmission aperture and the auxiliary transmission aperture may have substantially same shape and size and may be arranged linearly along an imaginary line. The light source unit may include a main light source unit corresponding to the main transmission aperture, and an auxiliary light source unit corresponding to the auxiliary transmission aperture. Heights and/or sizes of the main light source unit and the auxiliary light source unit may be determined to allow the light to be concentrated at a particular region with a particular size by a corresponding transmission aperture among the main transmission aperture and the auxiliary transmission aperture.

In some embodiments, the lens unit may include a convex lens and a concave lens disposed axially, and the convex lens and the concave lens may have different refractive indices. In particular, a refractive index of the concave lens may be greater than a refractive index of the convex lens. For example, the convex lens may be made of poly methyl methacrylate (PMMA), and the concave lens may be made of poly carbonate (PC). Light transmitted through the shield unit may pass through the convex lens after passing through the concave lens.

In some embodiments, the light source unit, the shield unit, and the lens unit may be arranged to be inclined with respect to the road surface.

According to the embodiments of the vehicle lamp of the present disclosure as described herein, there is an advantage in that the reversing of the vehicle may be notified to a nearby driver or pedestrian as the rear road surface pattern is formed when the vehicle is moving backwards. In addition, the roughness of the inner surface of transmission apertures in the shield unit may be reduced as the shield may be made of a glass material. In addition, the surfaces of adjacent shields may be prevented from coming into direct contact with one another when a plurality of shields are stacked, due to the protrusion member formed on the surface of the shield.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
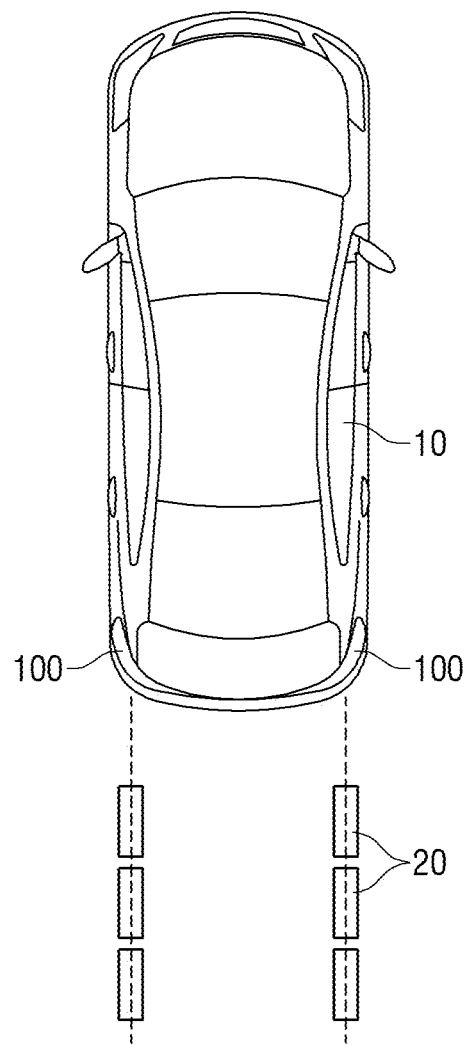
FIGS. 1 and 2 illustrate a road surface pattern formed by a vehicle lamp according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-section illustrations that are schematic illustrations of exemplary embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Figure 2:
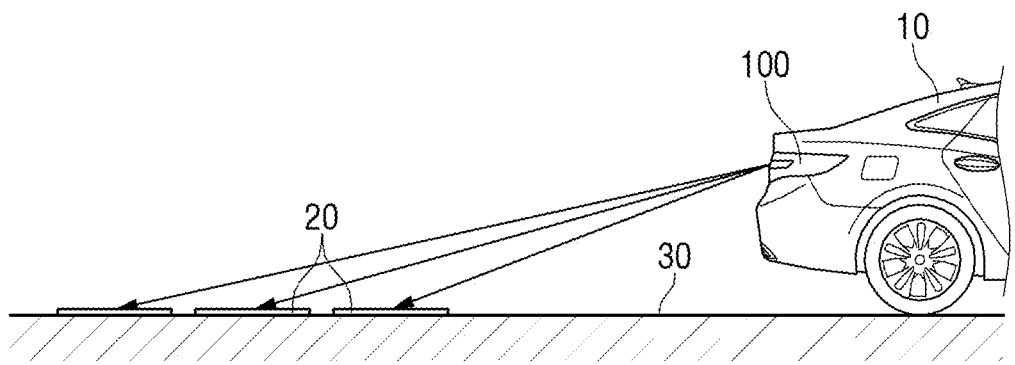

FIGS. 1 and 2 are views illustrating that a road surface pattern is formed by a vehicle lamp according to an embodiment of the present disclosure. Referring to FIGS. 1 and 2, the vehicle lamp 100 according to an embodiment of the present disclosure may form a road surface pattern 20 on a road surface 30. More specifically, the vehicle lamp 100 may form a road surface pattern 20 by irradiating light on the road surface 30. The road surface pattern 20 may be formed by concentrating light on a specific point of the road surface 30. In the present disclosure, the road surface pattern 20 may be formed on the road surface 30 at the rear of the vehicle 10 when the vehicle 10 moves backward. To this end, the vehicle lamp 100 may be provided at the rear of the vehicle 10.

The vehicle 10 may include a plurality of vehicle lamps 100. For example, the vehicle lamp 100 may be provided at the rear left and rear right sides of the vehicle 10, respectively. Different road surface patterns 20 may be formed by each vehicle lamp 100.

Each vehicle lamp 100 may form a plurality of road surface patterns 20. The plurality of road surface patterns 20 may be arranged linearly in the rear direction of the vehicle 10. Alternatively, according to some embodiments of the present disclosure, the plurality of road surface patterns 20 may be arranged in a direction inclined to the left or right with respect to the rear direction of the vehicle 10.

In the present disclosure, each of the plurality of road surface patterns 20 may have the same shape and size. For example, as shown in FIG. 1, each road surface pattern 20 may have a rectangular shape having the same horizontal and vertical lengths. However, it is merely an example that the plurality of road surface patterns 20 have the same shape and size, and the present disclosure is not limited thereto. Some or all of the plurality of road surface patterns 20 may be different from one another in some embodiments of the present disclosure. Hereinafter, the road surface pattern 20 having the same shape and size will be mainly described for description purposes.

In addition, although FIGS. 1 and 2 show that the number of the road surface patterns 20 formed by the vehicle lamp 100 is three, this is merely an example, and the number of the road surface patterns 20 to be formed by the vehicle lamp 100 may be variously determined. Hereinafter, a case in which three road surface patterns 20 are formed by the vehicle lamp 100 will be mainly described for description purposes.

Figure 3:
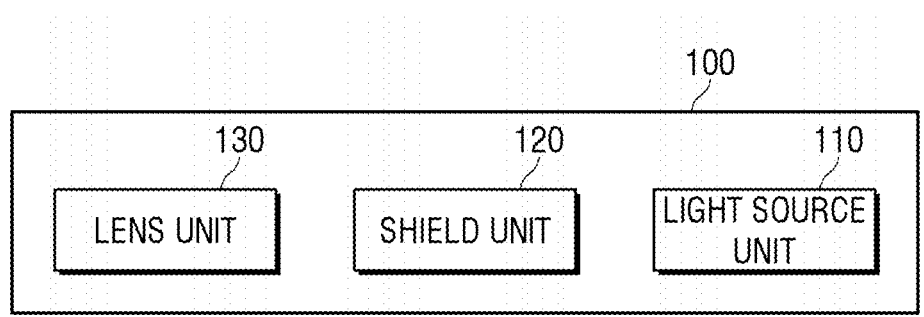
FIG. 3 describes the vehicle lamp shown in FIGS. 1 and 2.
Figure 4:
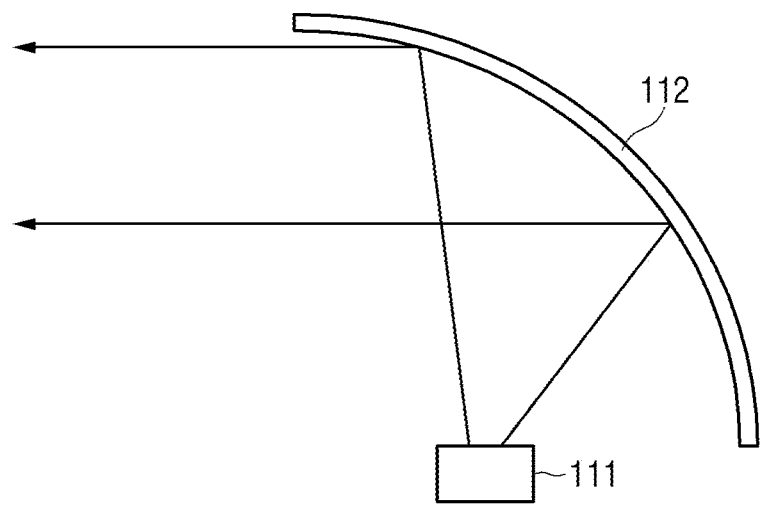
FIG. 4 shows an exemplary embodiment of the light source unit shown in FIG. 3.
Figure 4:
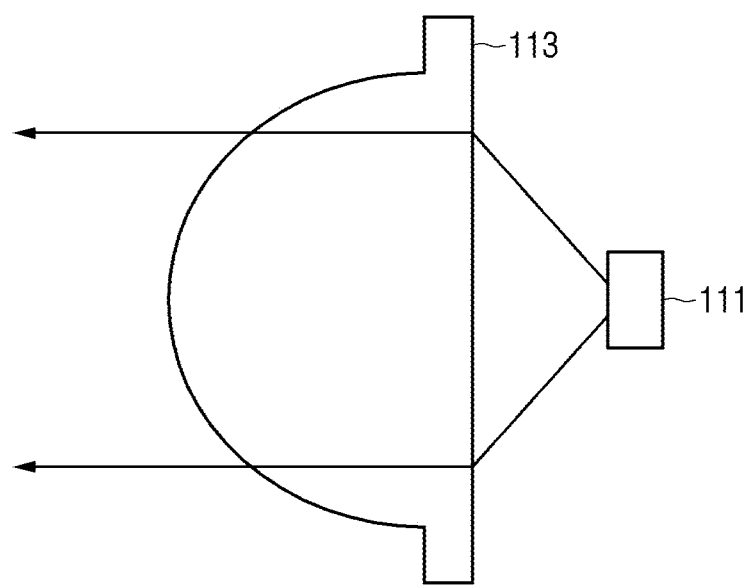

FIG. 3 is a view for describing the vehicle lamp shown in FIGS. 1 and 2, and FIG. 4 is a view showing an exemplary embodiment of the light source unit shown in FIG. 3. Referring to FIG. 3, a vehicle lamp 100 according to an embodiment of the present disclosure may include a light source unit 110, a shield unit 120, and a lens unit 130.

The light source unit 110 may generate light. Referring to FIG. 4, the light source unit 110 may include a light source 111 and optical units 112 and 113. The light source 111 may irradiate light. In the present disclosure, the light source 111 may include a light emitting diode (LED), but the light source 111 of the present disclosure is not limited to the light emitting diode. The optical units 112 and 113 may be provided in the form of a reflector as shown in (a), or may be provided in the form of a collimator as shown in (b). Alternatively, the reflector and the collimator may be combined to form the optical units 112 and 113.

Referring to FIG. 3 again, the shield unit 120 may selectively transmit a portion of the light of the light source unit 110. For example, the shield unit 120 may include a blocking region that blocks light and a transmission region that transmits light. A portion of the light of the light source unit 110 may be transmitted through the transmission region, and the remaining portion may be blocked by the blocking region. The light transmitted through the shield unit 120 may reach the lens unit 130.

The lens unit 130 may concentrate the light transmitted through the shield unit 120 on the road surface 30. The light concentrated on the road surface 30 may form the road surface pattern 20.

The shield unit 120 may include a plurality of transmission regions. A first portion of the plurality of transmission regions may form a main transmitted light, and a second portion of the plurality of transmission regions may form an auxiliary transmitted light. Among the light transmitted through the shield unit 120, the main transmitted light may form a plurality of road surface patterns 20. The auxiliary transmitted light among the light transmitted through the shield unit 120 may be irradiated to some selected road surface pattern 20 among the plurality of road surface patterns 20 to enhance the brightness of the selected road surface pattern 20. The portion of the plurality of road surface patterns 20 formed only with the main transmitted light may have lower brightness than other portions. As the auxiliary transmitted light is irradiated to the road surface pattern 20 that would otherwise have a relatively low brightness, the plurality of road surface patterns 20 having an overall uniform brightness can be formed on the road surface 30.

Figure 5:
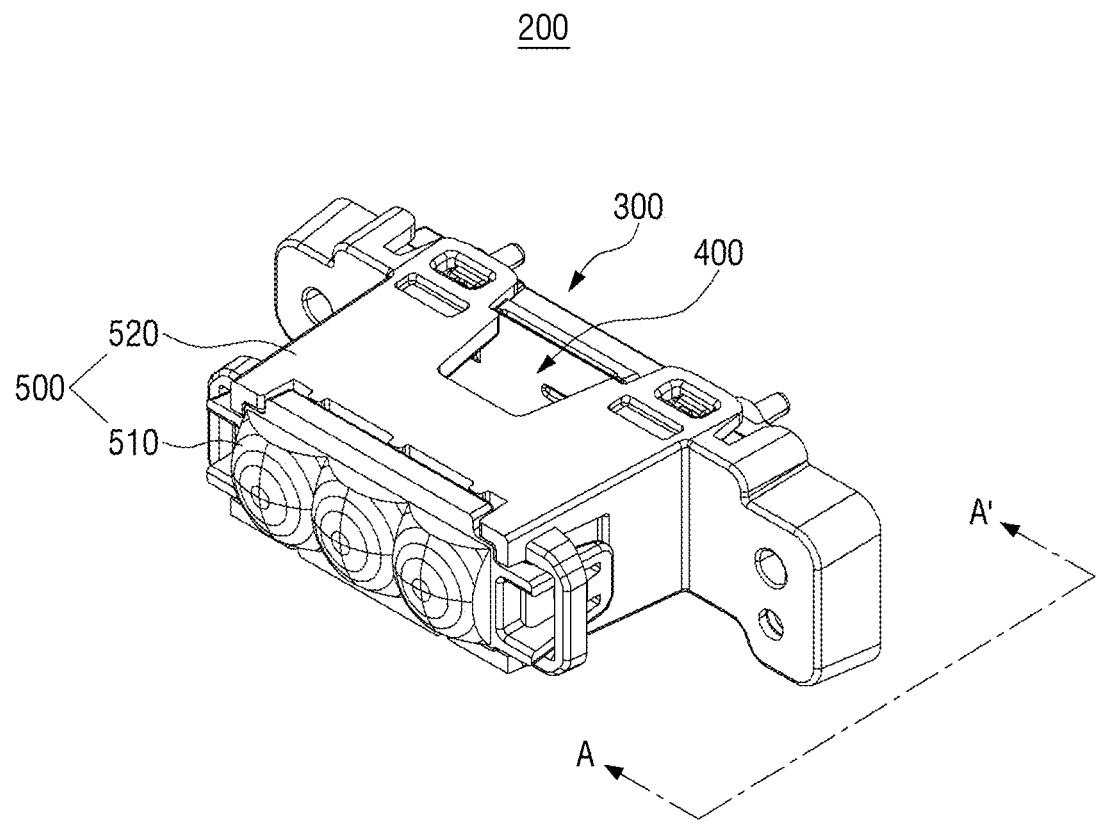
FIG. 5 shows an exemplary embodiment of the vehicle lamp shown in FIG. 3.
Figure 6:
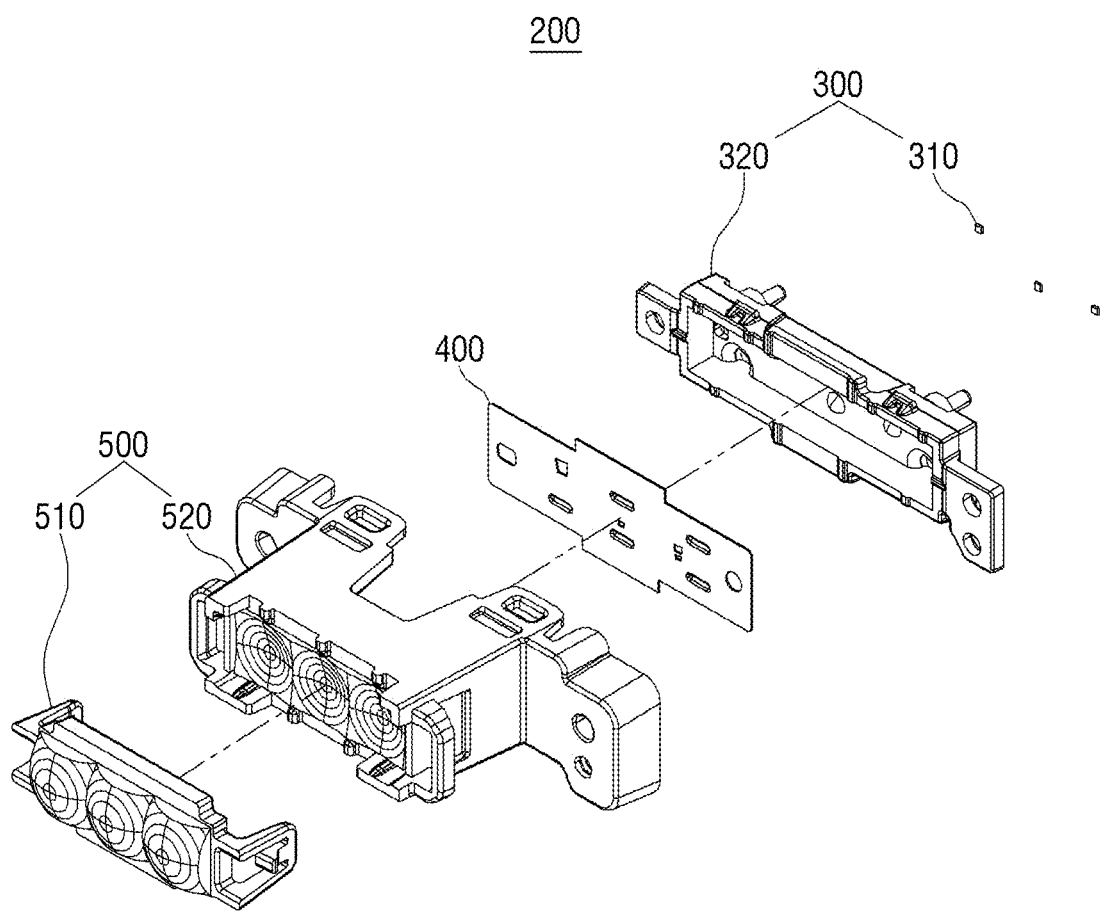
FIG. 6 is an exploded perspective view of the vehicle lamp shown in FIG. 5.
Figure 7:
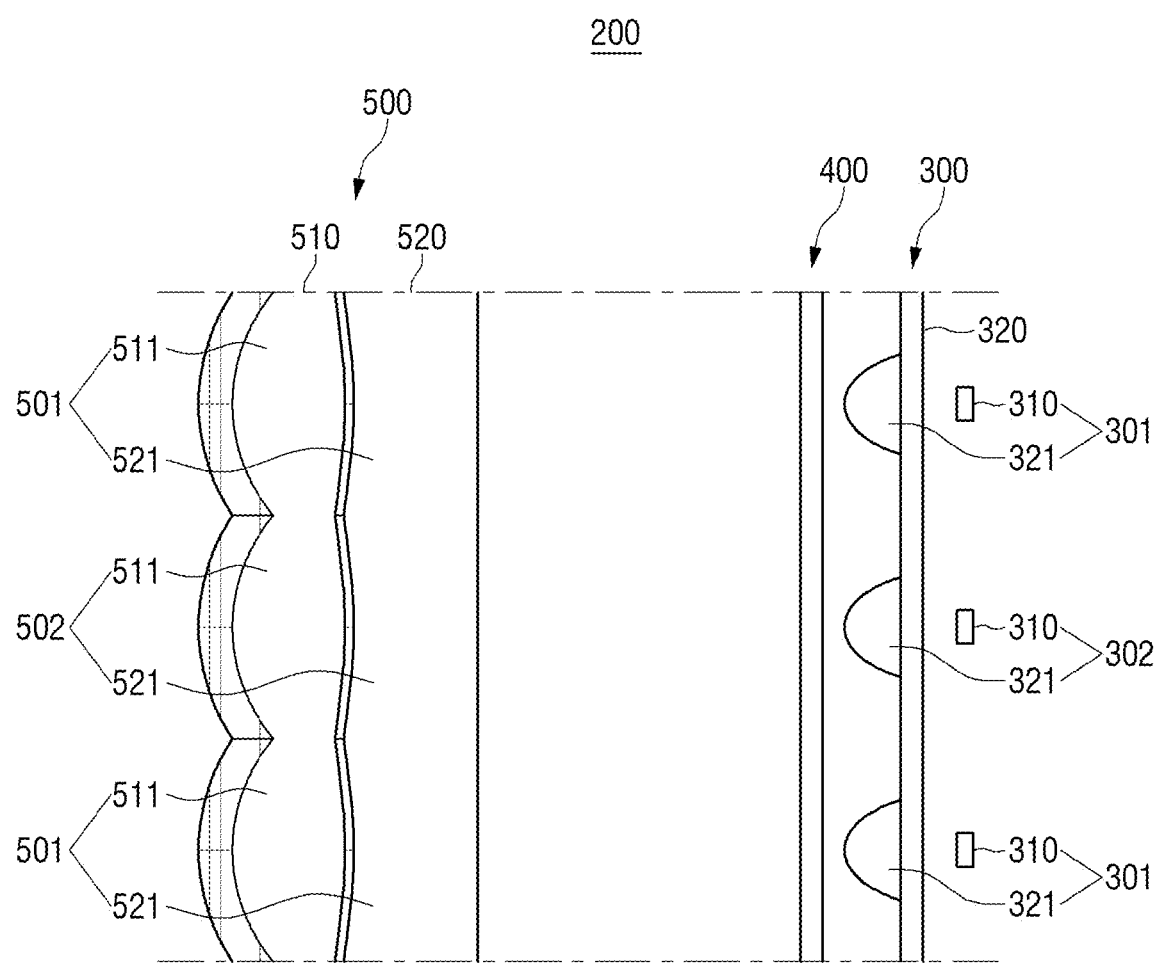
FIG. 7 is a cross-sectional view taken along line A-A' in FIG. 5.
Figure 8:
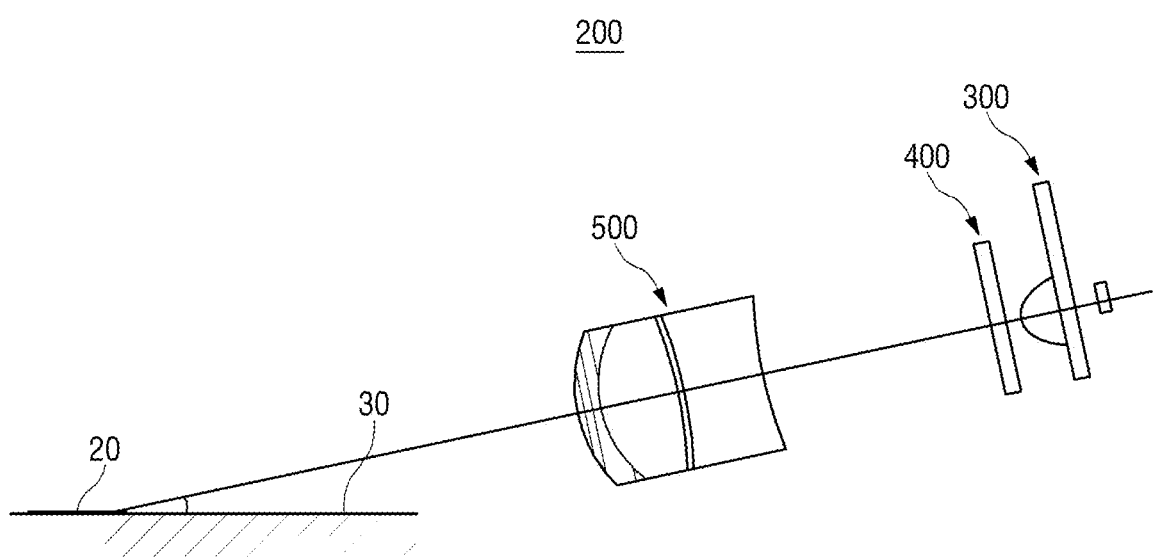
FIG. 8 describes the arrangement of a vehicle lamp with respect to a road surface.

FIG. 5 shows an exemplary embodiment of the vehicle lamp shown in FIG. 3, FIG. 6 is an exploded perspective view of the vehicle lamp shown in FIG. 5, FIG. 7 is a cross-sectional view taken along line A-A' in FIG. 5, and FIG. 8 describes the arrangement of a vehicle lamp with respect to a road surface. Referring to FIGS. 5 to 7, the vehicle lamp 200 may include a light source unit 300, a shield unit 400, and a lens unit 500.

The light source unit 300, the shield unit 400, and the lens unit 500 may be arranged front-to-back. In other words, the shield unit 400 may be arranged on the front surface of the light source unit 300, and the lens unit 500 may be arranged on the front surface of the shield unit 400.

Referring to FIG. 8, the arrangement direction of the light source unit 300, the shield unit 400, and the lens unit 500 may be inclined with respect to the road surface 30. Accordingly, the light generated from the light source unit 300 may be transmitted through the shield unit 400 and the lens unit 500 and may be mapped to the road surface 30 to form the road surface pattern 20.

Referring to FIGS. 5 to 7 again, the light source unit 300 may generate light. The light source unit 300 may include a light source 310 and an optical housing 320. The light source 310 may irradiate light. In the present disclosure, the light source 310 may include a light emitting diode (LED), but the light source 310 of the present disclosure is not limited to the light emitting diode.

The optical housing 320 may be coupled to a second lens unit 520 (see FIG. 6), which will be described later below. For example, the optical housing 320 and the second lens unit 520 may be coupled by a coupling means such as a bolt. The shield unit 400 may be arranged in a space formed by the optical housing 320 and the second lens unit 520. As the optical housing 320 and the second lens unit 520 are coupled, a distance between the shield unit 400 and the light source housing and a distance between the shield unit 400 and the lens unit 500 may be maintained to predetermined distances. The optical housing 320 may include an optical unit 321. The optical unit 321 may allow the light of the light source 310 to be irradiated with straightness in one direction. Light having straightness may be delivered to the shield unit 400.

The light source unit 300 may include a main light source unit 301 and an auxiliary light source unit 302. The main light source unit 301 may generate light configured to form the plurality of road surface patterns 20. The auxiliary light source unit 302 may generate light for enhancing (e.g., augmenting) the brightness of some selected road surface pattern 20 among the plurality of road surface patterns 20.

A detailed description of the light source unit 300 will be provided later below with reference to FIG. 9.

The shield unit 400 may selectively transmit a portion of the light that is generated from the light source unit 300. The shield unit 400 may include a plurality of transmission apertures 411, 412, and 420 (see FIG. 11) for transmitting the light, and the light transmitted through the plurality of transmission apertures 411, 412, and 420 may be irradiated to the road surface 30 to form the road surface pattern 20. A detailed description of the shape and function of the shield unit 400 will be provided later below with reference to FIGS. 11 to 15.

The lens unit 500 may concentrate the light transmitted through the shield unit 400 to the road surface 30. The lens unit 500 may include a first lens unit 510 and a second lens unit 520. The first lens unit 510 may include a convex lens 511, and the second lens unit 520 may include a concave lens 521. The first lens unit 510 and the second lens unit 520 may be combined. For example, the first lens unit 510 and the second lens unit 520 may be hook-coupled. To this end, one of the first lens unit 510 or the second lens unit 520 may include a locking groove, and the other may include a locking hook. As the first lens unit 510 and the second lens unit 520 are coupled, the convex lens 511 and the concave lens 521 may be arranged to overlap each other.

In some embodiments, a plurality of convex lenses 511 and a plurality of concave lenses 521 may be provided, respectively. The convex lens 511 and the concave lens 521 that overlap each other may form the main lens unit 501 or the auxiliary lens unit 502. The main lens unit 501 may transmit the light of the main light source unit 301 to concentrate the light that is used to form the plurality of road surface patterns 20 to the road surface 30. The auxiliary lens unit 502 may transmit the light of the auxiliary light source unit 302 to concentrate the light for enhancing the brightness of the selected road surface pattern 20 among the plurality of road surface patterns 20 to the road surface 30.

The convex lens 511 and the concave lens 521 may have different refractive indices. As will be described later below, as the convex lens 511 and the concave lens 521 having different refractive indices are axially disposed, chromatic aberration may be eliminated or reduced for the light transmitted through the lens unit 500.

Figure 9:
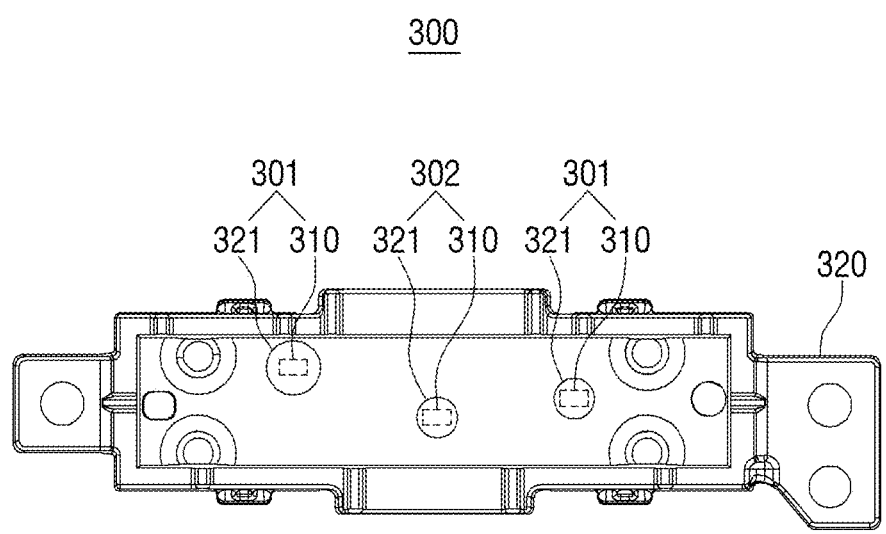
FIG. 9 is a front view of a light source unit according to an embodiment of the present disclosure.

FIG. 9 is a front view of a light source unit according to an embodiment of the present disclosure. Referring to FIG. 9, the light source unit 300 may include a main light source unit 301 and an auxiliary light source unit 302. The main light source unit 301 may generate light configured to form the road surface pattern 20, and the auxiliary light source unit 302 may generate light that enhances the brightness of some road surface pattern 20 among the plurality of road surface patterns 20 that are formed by the main light source unit 301.

The main light source unit 301 may be provided to correspond to the main transmission apertures 411 and 412 (see FIG. 11) provided in the shield unit 400, and the auxiliary light source unit 302 may be provided to correspond to the auxiliary transmission aperture 420 (see FIG. 11) provided in the shield unit 400. To this end, the main light source unit 301 may be arranged adjacent to the main transmission apertures 411 and 412 and may irradiate light to the main transmission apertures 411 and 412. The auxiliary light source unit 302 may be arranged adjacent to the auxiliary transmission apertures 420 and may irradiate light to the auxiliary transmission aperture 420.

Each of the main light source unit 301 and the auxiliary light source unit 302 may include a light source 310 and an optical unit 321. The optical unit 321 may have a size that corresponds to the size of the corresponding main transmission apertures 411 and 412 or the corresponding auxiliary transmission aperture 420. In the present disclosure, the main transmission apertures 411 and 412 may be formed to be larger than the auxiliary transmission aperture 420. Accordingly, the optical unit 321 arranged adjacent to the main transmission apertures 411 and 412 may be formed to be larger than the optical unit 321 arranged adjacent to the auxiliary transmission aperture 420. In addition, as will be described later below, a plurality of main transmission apertures 411 and 412 may be provided, and the largest main transmission aperture 411 among them may be separately arranged. The area of the largest main transmission aperture 411 may be formed to be larger than combined areas of the remaining main transmission apertures 412, and the optical unit 321 corresponding to the largest main transmission aperture 411 may be formed to be larger than the optical unit 321 corresponding to the remaining main transmission aperture 412.

Figure 10:
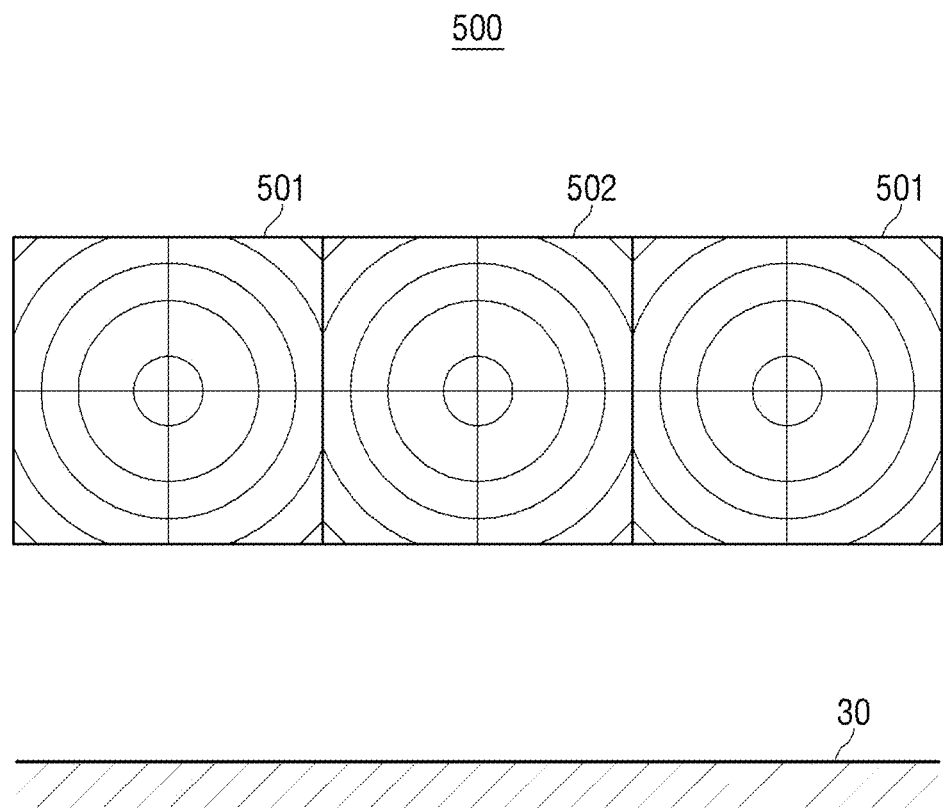
FIG. 10 is a front view of a lens unit according to an embodiment of the present disclosure.

FIG. 10 is a front view of the lens unit according to an embodiment of the present disclosure. Referring to FIG. 10, the lens unit 500 may include a main lens unit 501 and an auxiliary lens unit 502. The main lens unit 501 and the auxiliary lens unit 502 may be arranged side by side at the same height with respect to the road surface 30. When the performance of the main lens unit 501 and the auxiliary lens unit 502 is the same, the amount of light concentrated on the road surface 30 by the main lens unit 501 may be the same as the amount of light concentrated on the road surface 30 by the auxiliary lens unit 502.

Figure 11:
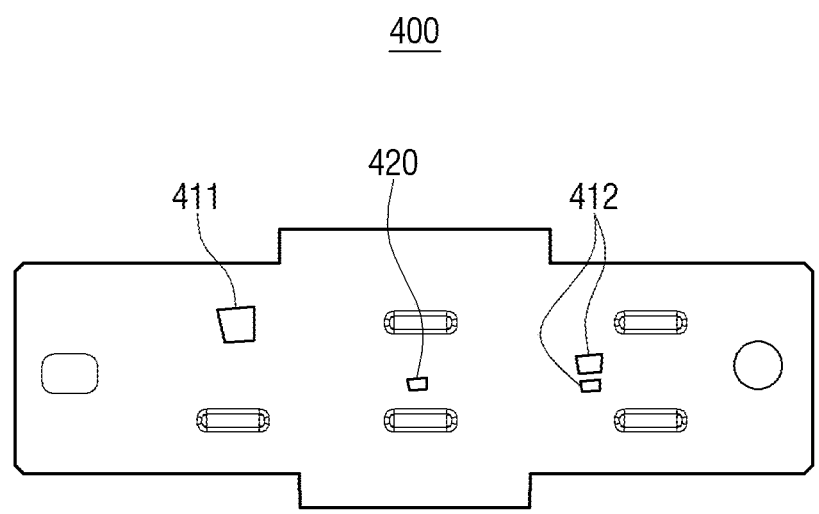
FIG. 11 is a front view of a shield unit according to an embodiment of the present disclosure.
Figure 12:
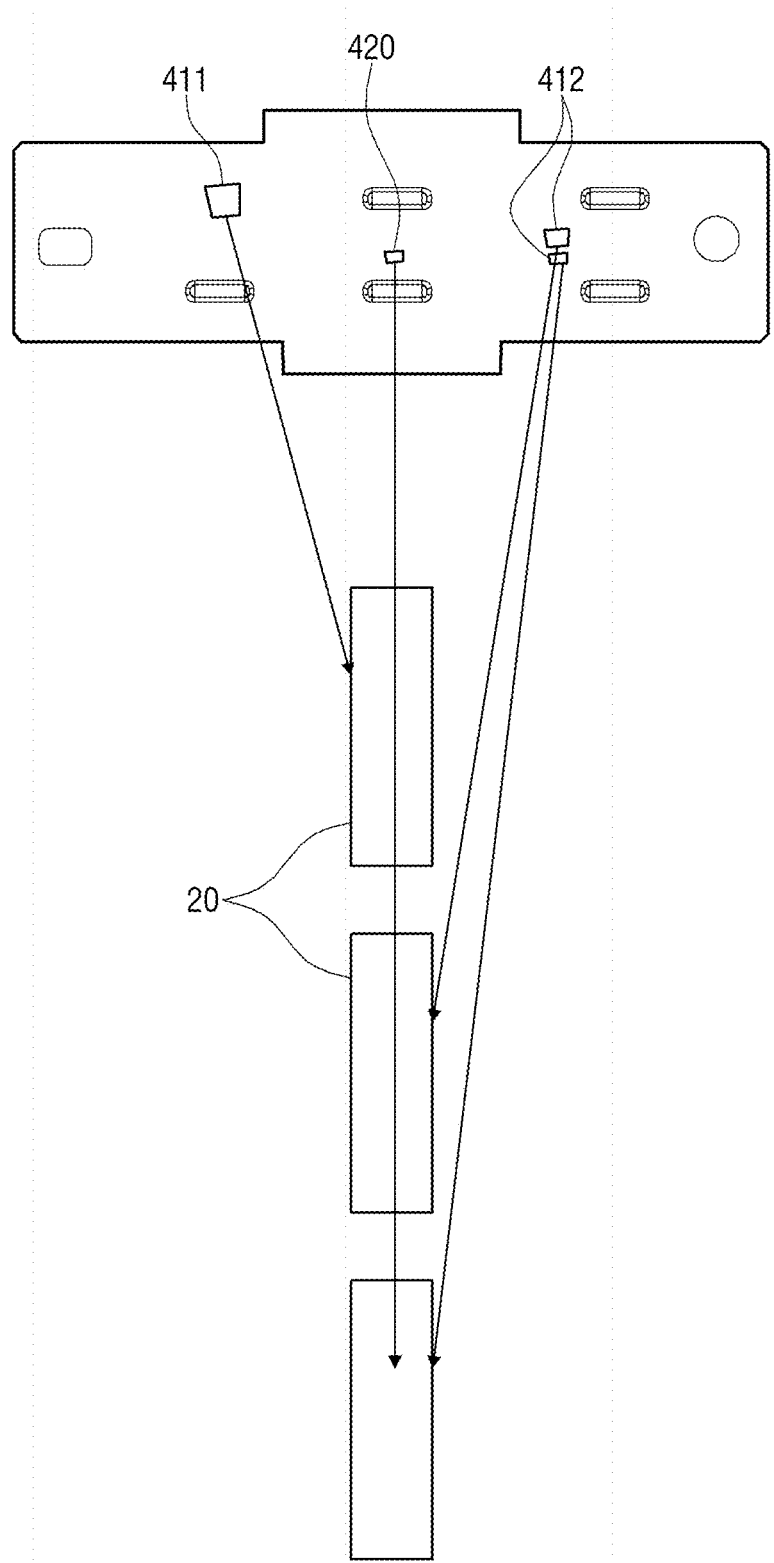
FIG. 12 describes a correspondence relationship between the transmission aperture of the shield unit and the road surface pattern.

FIG. 11 is a front view of a shield unit according to an embodiment of the present disclosure, and FIG. 12 describes a correspondence relationship between the transmission apertures of the shield unit and the road surface patterns. Referring to FIGS. 11 and 12, the shield unit 400 may include a plurality of transmission apertures 411, 412, and 420. The transmission apertures 411, 412, and 420 may include main transmission apertures 411 and 412 and an auxiliary transmission apertures 420. Herein, an example where one auxiliary transmission aperture is formed is described. However, the present disclosure is not limited thereto, and the number of auxiliary transmission apertures may be varied based on the required road surface patterns to be formed. Similarly, the number of main transmission apertures may be varied based on the required surface patterns. The main transmission apertures 411 and 412 may form the main transmitted light, and the auxiliary transmission aperture 420 may form the auxiliary transmitted light.

A plurality of main transmission apertures 411 and 412 may be provided. The plurality of main transmission apertures 411 and 412 may be arranged at different heights with respect to the road surface 30. The shape and size of each of the plurality of main transmission apertures 411 and 412 may be determined so that the plurality of road surface patterns 20 have the same shape and size. As will be described later below, the road surface pattern 20 that is projected through an upper main transmission aperture may be formed at a farther distance from the vehicle lamp 200, and the road surface pattern 20 that is projected through a lower main transmission aperture may be formed at a closer distance from the vehicle lamp 200.

Since the light transmitted through the main transmission apertures 411 and 412 diffuses while being irradiated, when the plurality of main transmission apertures 411 and 412 have the same size, the road surface pattern 20 projected by the main transmission apertures 411 and 412 may become larger as it is projected farther from the vehicle lamp 200, and may become smaller as it is projected closer to the vehicle lamp 200. As such, the size (e.g., width) of the main transmission apertures 411 and 412 may be configured to increase as it goes upward and to decrease as it goes downward in order to form a plurality of road surface patterns 20 having the same shape and size. In other words, to form a rectangle shape for the road surface pattern 20, the shapes of the main transmission apertures 411 and 412 may be designed to be trapezoidal, and the size of each of the main transmission apertures 411 and 412 may be determined so that the sizes of the road surface patterns 20 to be formed on the road surface 30 are substantially the same.

Meanwhile, the road surface pattern 20 that is formed after passing through a relatively small main transmission apertures 411 and 412 may have a relatively low brightness. With such a tendency, the road surface pattern 20 may have a lower brightness as it goes downward among the plurality of main transmission apertures 411 and 412.

The plurality of main transmission apertures 411 and 412 may be arranged linearly. Meanwhile, at least some of the plurality of main transmission apertures 411 and 412 may be arranged to be separated from the line. Specifically, the main transmission aperture 411 having the largest size among the plurality of main transmission apertures 411 and 412 may be arranged to be separated from the line formed by the remaining main transmission apertures 412. Hereinafter, the main transmission aperture 411 having the largest size may be referred to as a first main transmission aperture 411, and the remaining group of main transmission apertures 412 may be referred to as a second main transmission aperture 412.

The area of the first main transmission aperture 411 may be larger than the area of the second main transmission aperture 412. The main light source unit 301 may be provided separately for the first main transmission aperture 411 and the second main transmission aperture 412. When the light of one main light source unit 301 passes through all of the main transmission apertures, the brightness of the road surface pattern 20 may become non-uniform due to different distances between the vehicle lamp 200 and the road surface pattern 20. By separately arranging the main light source unit 301 in the first main transmission aperture 411 and the second main transmission aperture 412, regardless of the distance between the vehicle lamp 200 and the road surface pattern 20, more uniform brightness may be obtained.

The auxiliary transmitted light that is transmitted through the auxiliary transmission aperture 420 may be irradiated to the road surface pattern 20 that would otherwise have a relatively low brightness among the plurality of road surface patterns 20. Accordingly, the plurality of road surface patterns 20 may be observed with more uniform brightness.

The auxiliary transmitted light may form a light pattern having the same or similar shape as the road surface pattern 20 on the road surface 30. To this end, the auxiliary transmission aperture 420 may have the same or similar shape and size as the main transmission apertures 411 and 412. Specifically, the shape and size of the auxiliary transmission aperture 420 may be the same as or similar to the shape and size of the main transmission aperture 412 that forms the road surface pattern 20 of relatively low brightness among the plurality of main transmission apertures 411 and 412. Accordingly, the light pattern formed on the road surface 30 after passing through the auxiliary transmission aperture 420 may be overlapped (e.g. superimposed) with the road surface pattern 20 of low brightness so that the overall resulting brightness of the road surface pattern 20 may become more uniform.

Figure 13:
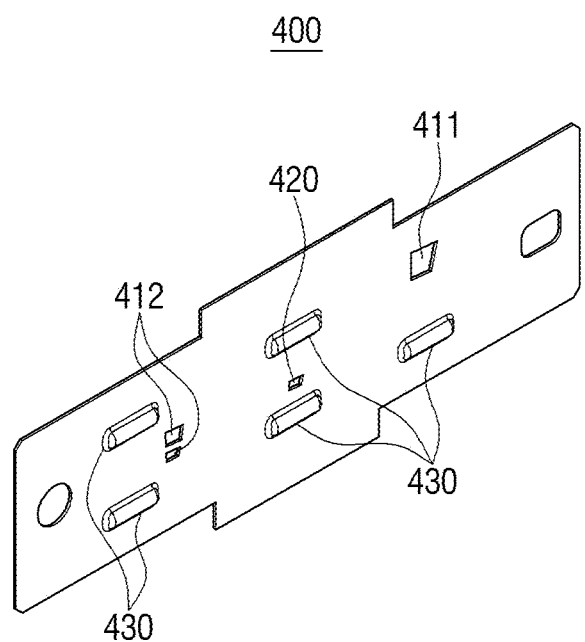
FIG. 13 is a rear perspective view of a shield unit according to an embodiment of the present disclosure.
Figure 14:
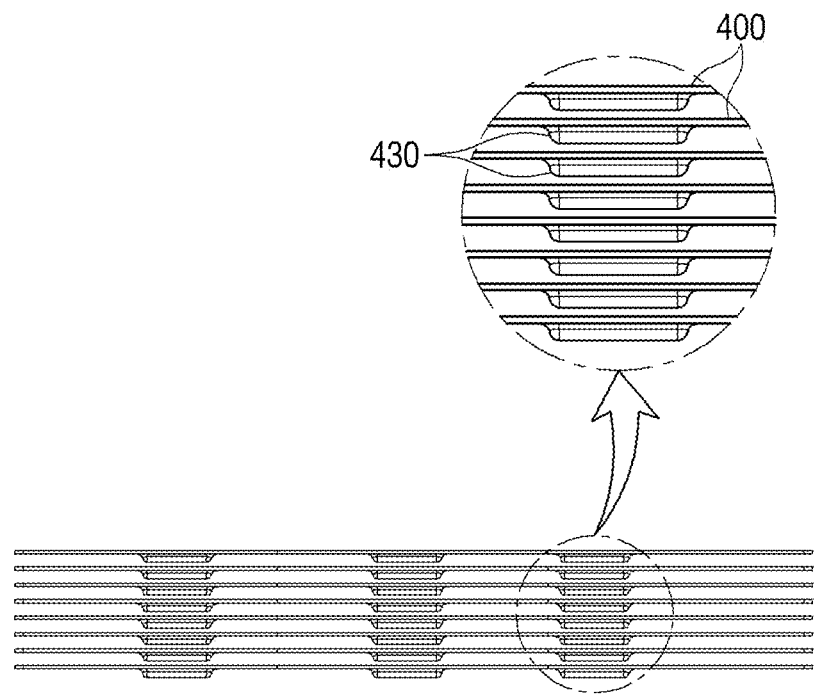
FIG. 14 shows a plurality of shield units that are stacked.
Figure 15:
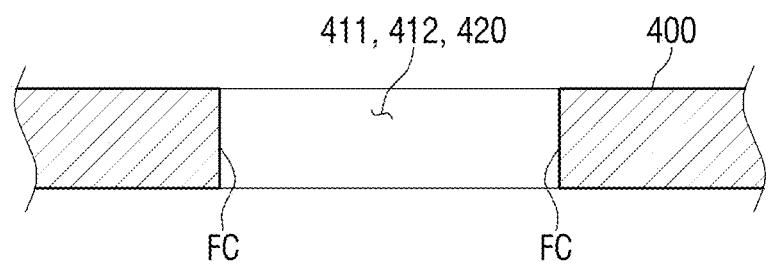
FIG. 15 shows a transmission aperture of a shield unit according to an embodiment of the present disclosure.
Figure 16:
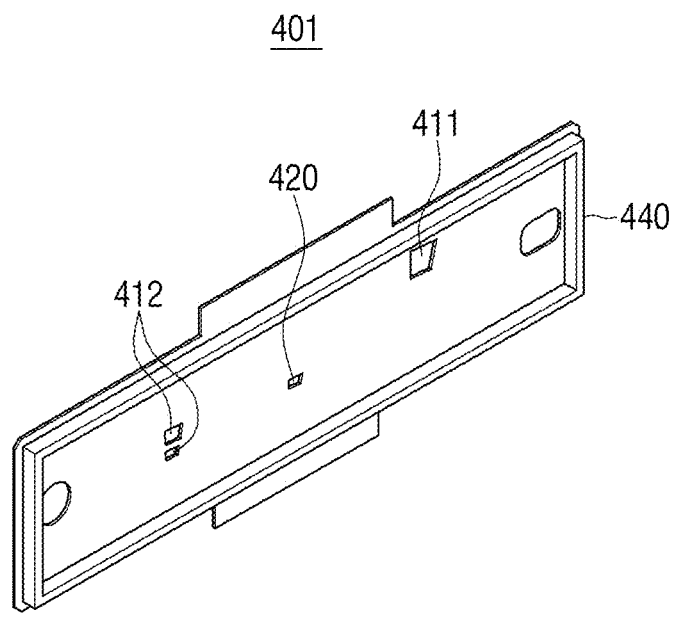
FIG. 16 is a rear perspective view of a shield unit having another embodiment of a protrusion member different from the embodiment shown in FIG. 13.

FIG. 13 is a rear perspective view of the shield unit, FIG. 14 shows a plurality of shield units that are stacked, FIG. 15 shows a transmission aperture of the shield unit, and FIG. 16 is a rear perspective view of a shield unit having a protrusion member different from the protrusion member shown in FIG. 13. Referring to FIG. 13, a protrusion member 430 that protrudes outwardly (e.g., forward) may be formed on the surface of the shield unit 400.

A plurality of protrusion members 430 may be provided on the surface of the shield unit 400, and the plurality of protrusion members 430 may have substantially the same protrusion length from the surface of the shield unit 400. As the plurality of protrusion members 430 are provided with the same protrusion length, as shown in FIG. 14, the plurality of shielding units 400 may be stacked on a seating surface. During the manufacturing of the shield unit 400 as well as handling the shield unit 400 during the manufacturing process, a plurality of shield units 400 may be stored in a place. In this case, a user (e.g., a worker) may store the plurality of shield units 400 by stacking them. Since the protrusion members 430 formed on the shield unit 400 facilitates maintaining the spacing between the adjacent shield units 400, damage to the surface of the shield unit 400 due to abrasion between the shield units 400 may be prevented.

Also, according to the present disclosure, the shield unit 400 may be made of a glass material. The glass material may be processed by cutting. Accordingly, as shown in FIG. 15, cutting process of the inner surface FC of the transmission apertures 411, 412, and 420 formed in the shield unit 400 may be more easily performed, and the roughness of the inner surface may be reduced.

A material for preventing light transmission may be applied on the surface of the shield unit 400 that is made of a glass material. Thus, light may be transmitted only through the transmission apertures 411, 412, and 420, and may be blocked in the remaining regions.

In the above-described embodiment, the plurality of protrusion members 430 provided at different points of the shield unit 400 have been described. However, according to another embodiment of the present disclosure, one protrusion member may be provided in the shield unit. Referring to FIG. 16, the shield unit 401 may include a protrusion member 440 that is formed in a different shape from the protrusion member 430 shown in FIG. 13.

The protrusion member 440 may be formed to be extended to continuously connect different regions of the surface of the shield unit 401. For example, the protrusion member 440 may be formed from a curvilinear base shape such as a ring shape along the edge of a surface of the shield unit 401. The base shape may have a predetermined width, and the extended length thereof may be substantially longer than the predetermined width. The curvilinear base shape may form a closed loop (as shown inf FIG. 16), or at least some portions may be open. Each portion of the protrusion member 440 may have a substantially constant protrusion length from the surface of the shield unit 401. As the entire protrusion member 440 has the constant height, a plurality of shield units 401 may be stacked on a seating surface, similarly as shown in FIG. 14.

Hereinafter, the shield unit 400 provided with the plurality of protrusion members 430 will be mainly described.

Figure 17:
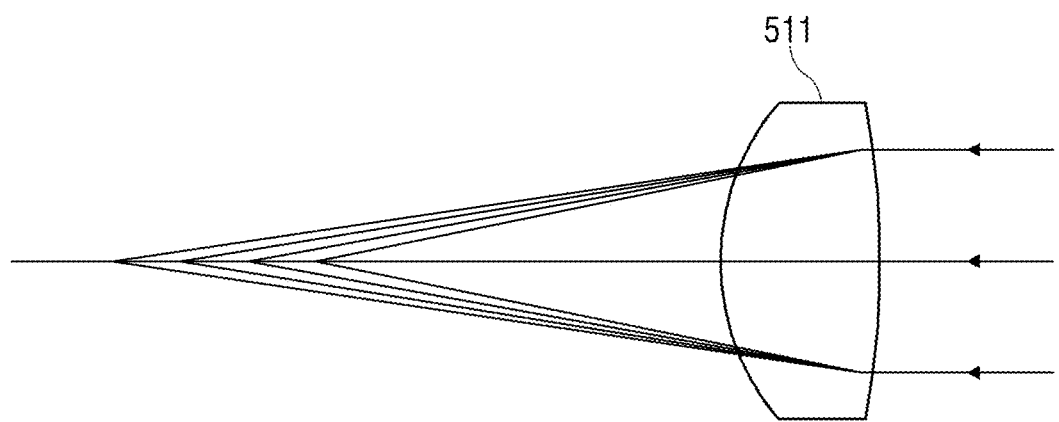
FIG. 17 illustrates chromatic aberration formed by a convex lens.
Figure 18:
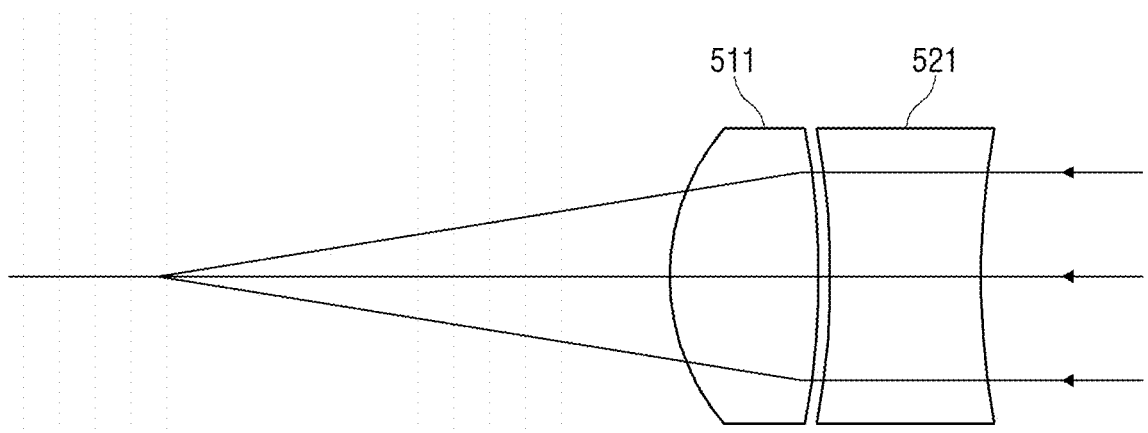
FIG. 18 describes chromatic aberration removed by the lens unit.
Figure 19:
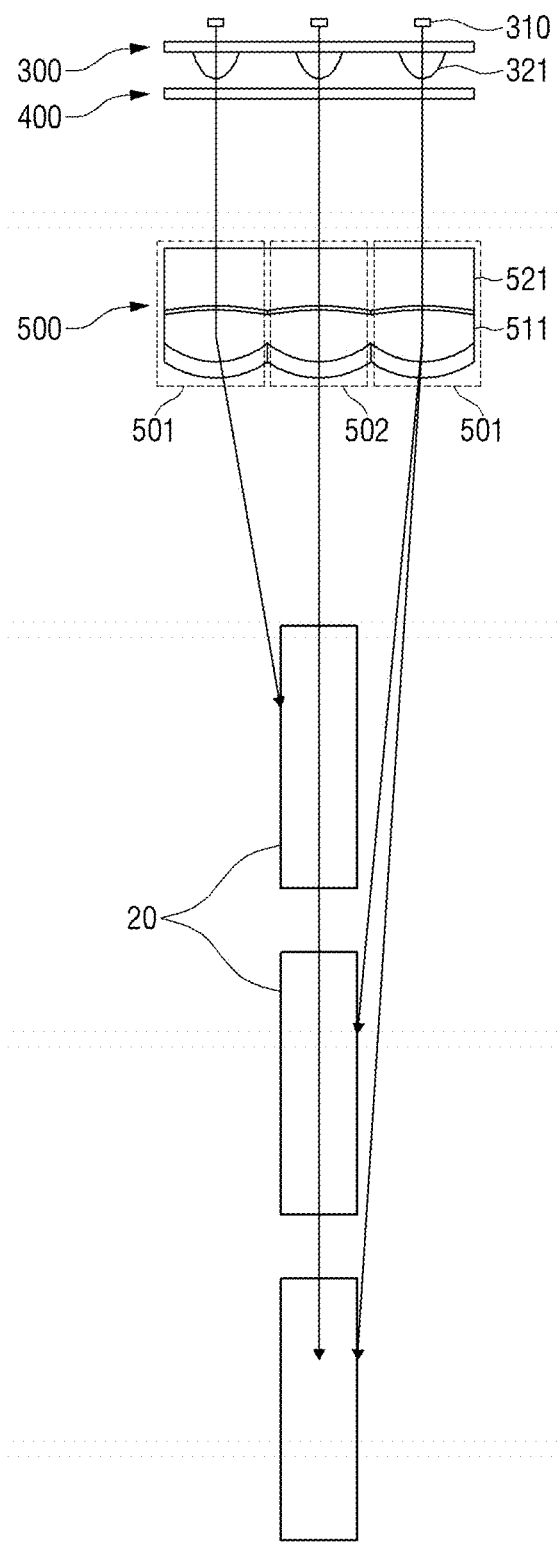
FIG. 19 shows a road surface pattern formed by a vehicle lamp.
Figure 20:
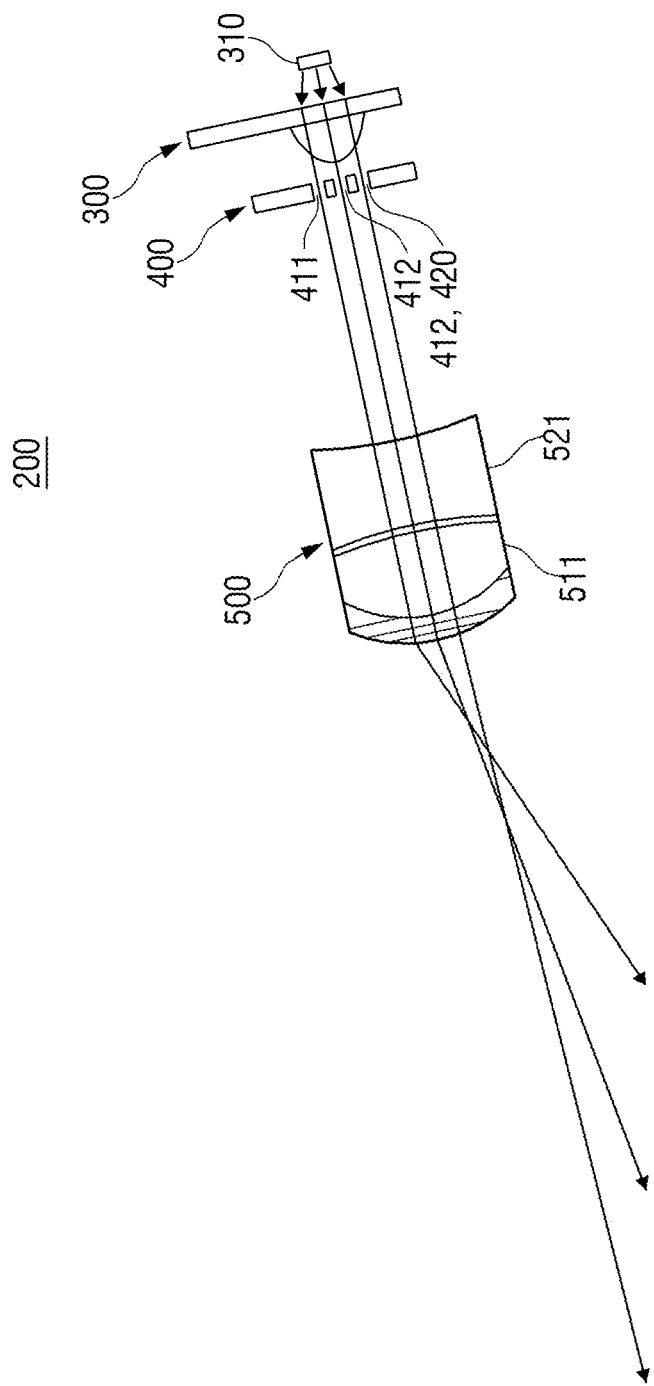
FIG. 20 describes the function of the lens unit based on the position of the transmission aperture.

FIG. 17 shows chromatic aberration that may be formed by a convex lens, FIG. 18 describes that chromatic aberration may be removed by the lens unit, FIG. 19 shows a road surface pattern formed by a vehicle lamp, and FIG. 20 describes the function of the lens unit depending on the position of the transmission aperture.

Referring to FIG. 17, when a lens unit includes only a convex lens, chromatic aberration may occur. More specifically, when the light of the light source unit 300 passes through only the convex lens 511, the light is separated by wavelengths, and the light of different wavelengths may have different focal lengths. In this case, the edge of the road surface pattern 20 may not be clear, and certain colors may appear.

On the other hand, referring to FIG. 18, the lens unit 500 of the vehicle lamp 200 according to the embodiment of the present disclosure may include a convex lens 511 and a concave lens 521. The convex lens 511 and the concave lens 521 may have different refractive indices. For example, the concave lens 521 may have a greater refractive index than the convex lens 511. For example, the convex lens 511 may be made of poly methyl methacrylate (PMMA), and the concave lens 521 may be made of poly carbonate (PC). However, the materials of the convex lens 511 and the concave lens 521 of the present disclosure are not limited thereto.

Due to the combination of the convex lens 511 and the concave lens 521, the chromatic aberration of the light transmitted through the lens unit 500 may be reduced. More specifically, when the light of the light source unit 300 passes through the convex lens 511 and the concave lens 521, the focal length of the light for each wavelength may be more uniformly formed. As such, the edge of the road surface pattern 20 may be more clearly formed. The light transmitted through the shield unit 400 may pass through the convex lens 511 after passing through the concave lens 521. The convex lens 511 may concentrate the incident light to a focal point. Accordingly, the shape of the road surface pattern 20 may be observed more clearly due to the concentration of the light transmitted through the convex lens 511 on the road surface 30.

Referring to FIGS. 19 and 20, the lens unit 500 may concentrate the light transmitted through the shield unit 400 to the road surface 30. The lens unit 500 may refract the light transmitted through the shield unit 400 to be concentrated on the road surface 30. The light concentrated on the road surface 30 may form the road surface pattern 20. The main lens unit 501 and the auxiliary lens unit 502 may refract light to allow the light to be irradiated to the corresponding road surface pattern 20.

Referring to FIG. 20, the lens unit 500 may refract the light so that the light is concentrated at different positions on the road surface 30 based on the positions of the transmission apertures 411, 412, and 420 provided in the shield unit 400.

The lens unit 500 may refract the light so that the light is concentrated at a position closer to the vehicle lamp 200 as the position of the transmission apertures 411, 412, and 420 is higher, and the lens unit 500 may refract the light so that the light is concentrated at a position farther from the vehicle lamp 200 as the position of the transmission apertures 411, 412, and 420 is lower. The light transmitted through the different transmission apertures 411, 412, and 420 may be concentrated on the road surface 30 after being refracted by the lens unit 500 to form different road surface patterns 20.

Figure 21:
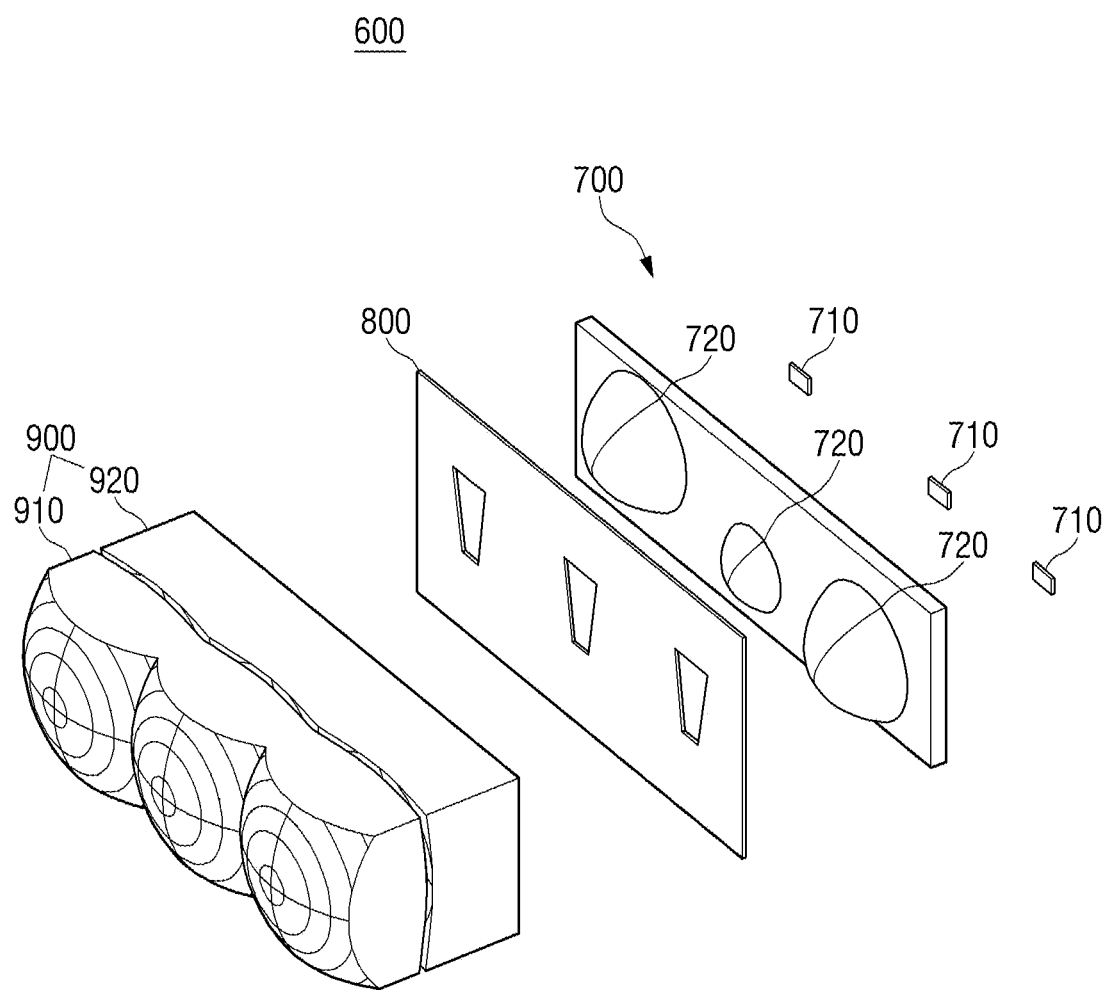
FIG. 21 shows another exemplary embodiment of the vehicle lamp shown in FIG. 3.
Figure 22:
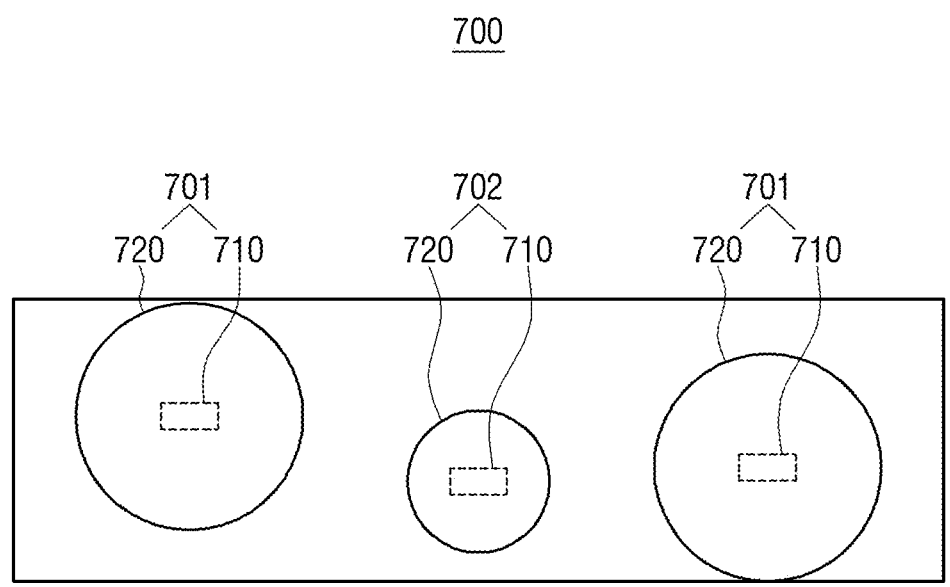
FIG. 22 is a front view of the light source unit of the vehicle lamp shown in FIG. 21.
Figure 23:
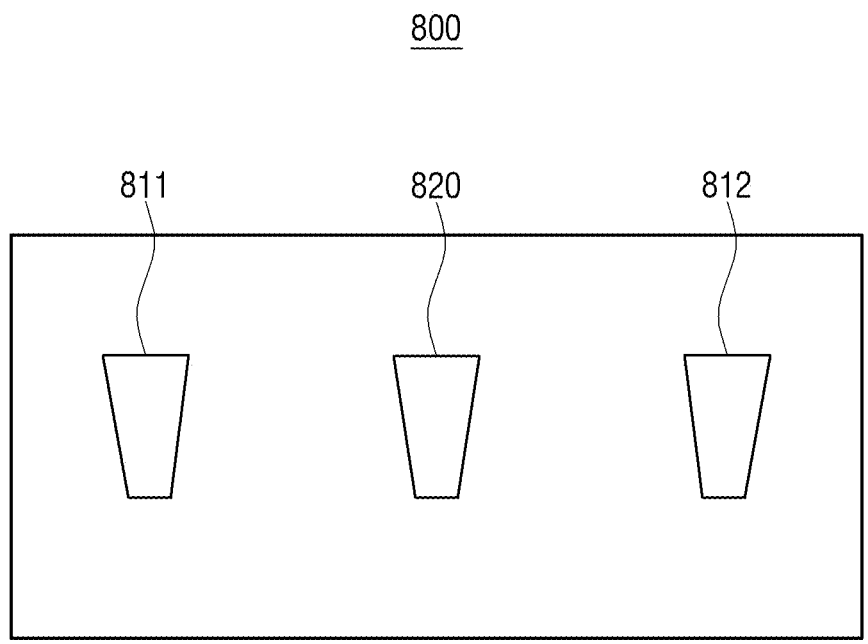
FIG. 23 is a front view of the shield unit of the vehicle lamp shown in FIG. 21.

FIG. 21 is a view showing another exemplary form of the vehicle lamp shown in FIG. 3, FIG. 22 is a front view of the light source unit of the vehicle lamp shown in FIG. 21, and FIG. 23 is a front view of the shield unit of the vehicle lamp shown in FIG. 21. Referring to FIGS. 21 to 23, the vehicle lamp 600 may include a light source unit 700, a shield unit 800, and a lens unit 900. The light source unit 700, the shield unit 800, and the lens unit 900 may be arranged front-to-back. In other words, the shield unit 800 may be arranged on the front surface of the light source unit 700, and the lens unit 900 may be arranged on the front surface of the shield unit 800.

The light source unit 700 may include a light source 710 and an optical unit 720. The light source 710 may irradiate light, and the optical unit 720 may allow the light of the light source 710 to be irradiated with straightness in one direction. Light having straightness may be transmitted to the shield unit 800.

The light source unit 700 may include a main light source unit 701 and an auxiliary light source unit 702. The main light source unit 701 and the auxiliary light source unit 702 may collectively form a road surface pattern. In particular, the main light source unit 701 may form a road surface pattern, in which light is concentrated in a specific region among the irradiation regions of the road surface, and the auxiliary light source unit 702 may form a road surface pattern for enhancing brightness in a specific region of the road surface pattern of the main light source unit 701.

The shield unit 800 may selectively transmit a portion of the light of the light source unit 700. The shield unit 800 may include a plurality of transmission apertures 811, 812, and 820 for transmitting light, and the light transmitted through the plurality of transmission apertures 811, 812, and 820 may be irradiated to the road surface to form a road surface pattern.

The lens unit 900 may concentrate the light transmitted through the shield unit 800 to the road surface. The lens unit 900 may include a first lens unit 910 and a second lens unit 920. The first lens unit 910 may include a convex lens, and the second lens unit 920 may include a concave lens.

The shapes and functions of the light source unit 700, the shield unit 800, and the lens unit 900 are similar to those of the light source unit 300, the shield unit 400, and the lens unit 500 described above. Hereinafter, the differences will be mainly described.

Referring to FIG. 22, the light source unit 700 may include a main light source unit 701 and an auxiliary light source unit 702. The main light source unit 701 may generate light configured to form a road surface pattern, in which light is concentrated in a specific region, and the auxiliary light source unit 702 may generate light for enhancing (e.g., augmenting) the brightness of some selected region among the road surface patterns formed by the main light source unit 701.

The main light source unit 701 may be provided corresponding to the main transmission apertures 811 and 812 provided in the shield unit 800, and the auxiliary light source unit 702 may be provided corresponding to the auxiliary transmission aperture 820 provided in the shield unit 800. To this end, the main light source unit 701 may be arranged adjacent to the main transmission apertures 811 and 812 and may irradiate light to the main transmission apertures 811 and 812. The auxiliary light source unit 702 may be arranged adjacent to the auxiliary transmission apertures 820 and may irradiate light to the auxiliary transmission apertures 820.

Each of the main light source unit 701 and the auxiliary light source unit 702 may include a light source 710 and an optical unit 720. The heights and sizes of the main light source unit 701 and the auxiliary light source unit 702 may be determined so that light is concentrated in a specific region and a specific size by the corresponding transmission apertures among the main transmission apertures 811 and 812 and the auxiliary transmission aperture 820.

As will be described later below, the main transmission apertures 811 and 812 and the auxiliary transmission aperture 820 formed in the shield unit 800 may have the same shape and size. Meanwhile, light transmitted through each of the main transmission apertures 811 and 812 and the auxiliary transmission aperture 820 may form different road surface patterns. The main light source unit 701 and the auxiliary light source unit 702 may be configured to form road surface patterns having different shapes by the transmission apertures having the same shape and size. For example, one of the main light source units 701 may be arranged at a higher position with respect to the road surface than others, and the auxiliary light source unit 702 may have a smaller size than the main light source unit 701. In the present disclosure, the size of the light source unit 700 may be understood as the size of the optical unit 720.

Referring to FIG. 23, the shield unit 800 may include a plurality of transmission apertures 811, 812, and 820. The transmission apertures 811, 812, and 820 may include main transmission apertures 811 and 812 and auxiliary transmission aperture 820. The main transmission apertures 811 and 812 may form main transmitted light, and the auxiliary transmission aperture 820 may form auxiliary transmitted light.

In some embodiments, a plurality of main transmission apertures 811 and 812 may be provided. The main transmission apertures 811 and 812 and the auxiliary transmission aperture 820 may have the same shape and size and may be arranged side by side. For example, the main transmission apertures 811 and 812 and the auxiliary transmission apertures 820 may be arranged at the same height with respect to the road surface.

Although the shapes and sizes of the main transmission apertures 811 and 812 and the auxiliary transmission aperture 820 are the same, a point to which the light is concentrated and transmitted may be different. For example, one of the main transmission apertures 811 and 812 may be transmitted by concentrating light at an upper point, and another of the main transmission apertures 811 and 812 may be transmitted by concentrating light at a middle point. In addition, the auxiliary transmission aperture 820 may be transmitted by concentrating light at a lower point.

Even if the shape and size of the transmission apertures 811, 812, and 820 are the same, the shape of the road surface pattern by the light transmitted through each of the transmission apertures 811, 812, and 820 and the region where the light is concentrated may be different since the points to which the light is transmitted and concentrated may be different.

Figure 24:
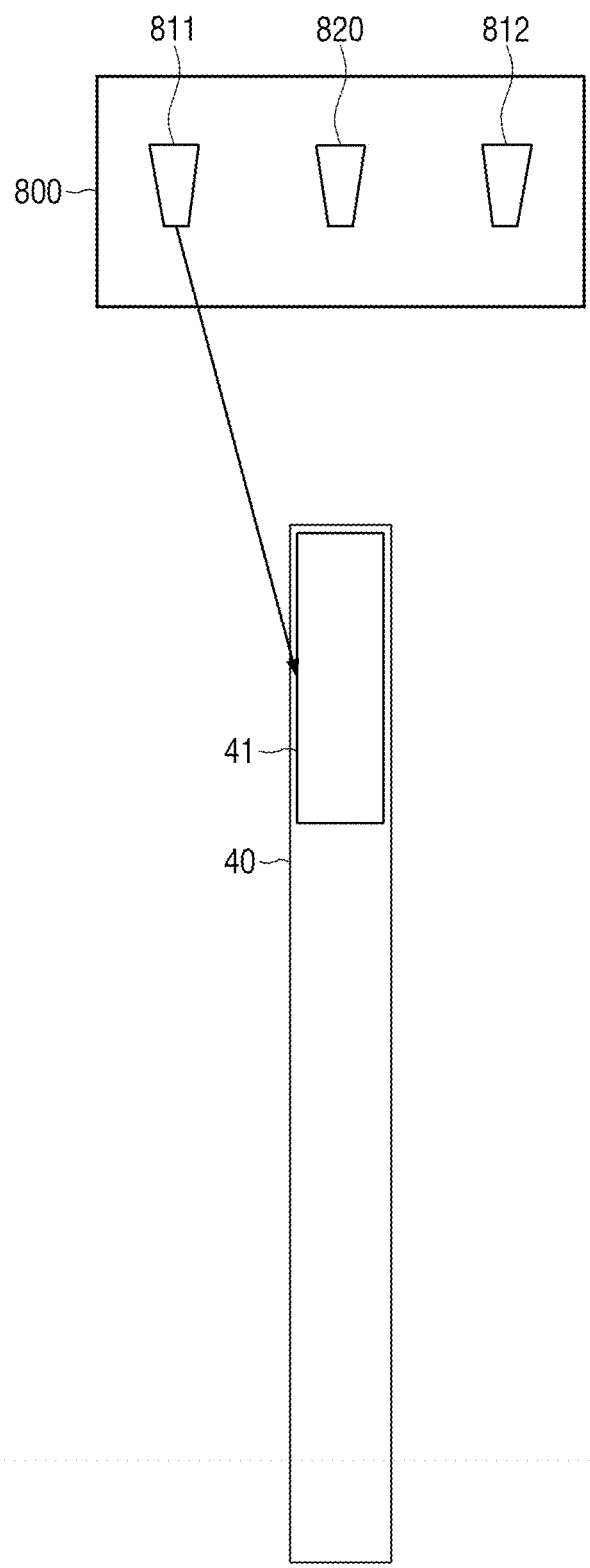
FIG. 24 shows a road surface pattern formed by the first main transmission aperture.
Figure 25:
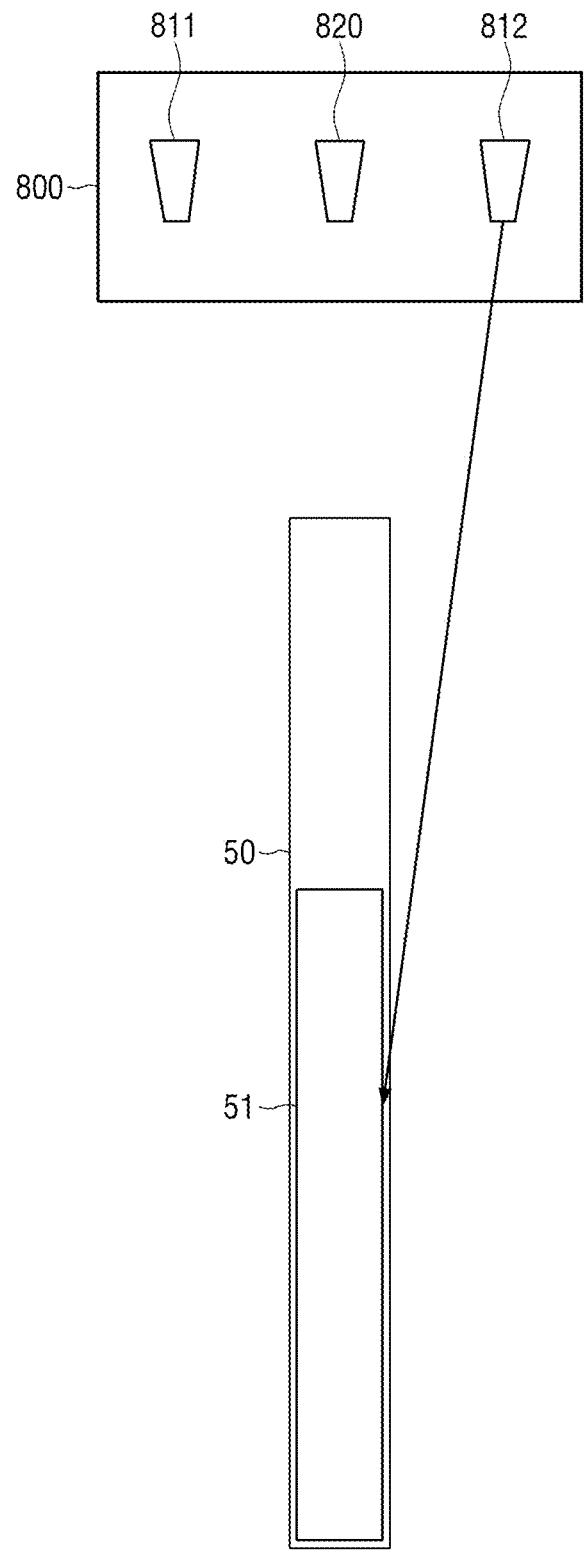
FIG. 25 shows a road surface pattern formed by the second main transmission aperture.
Figure 26:
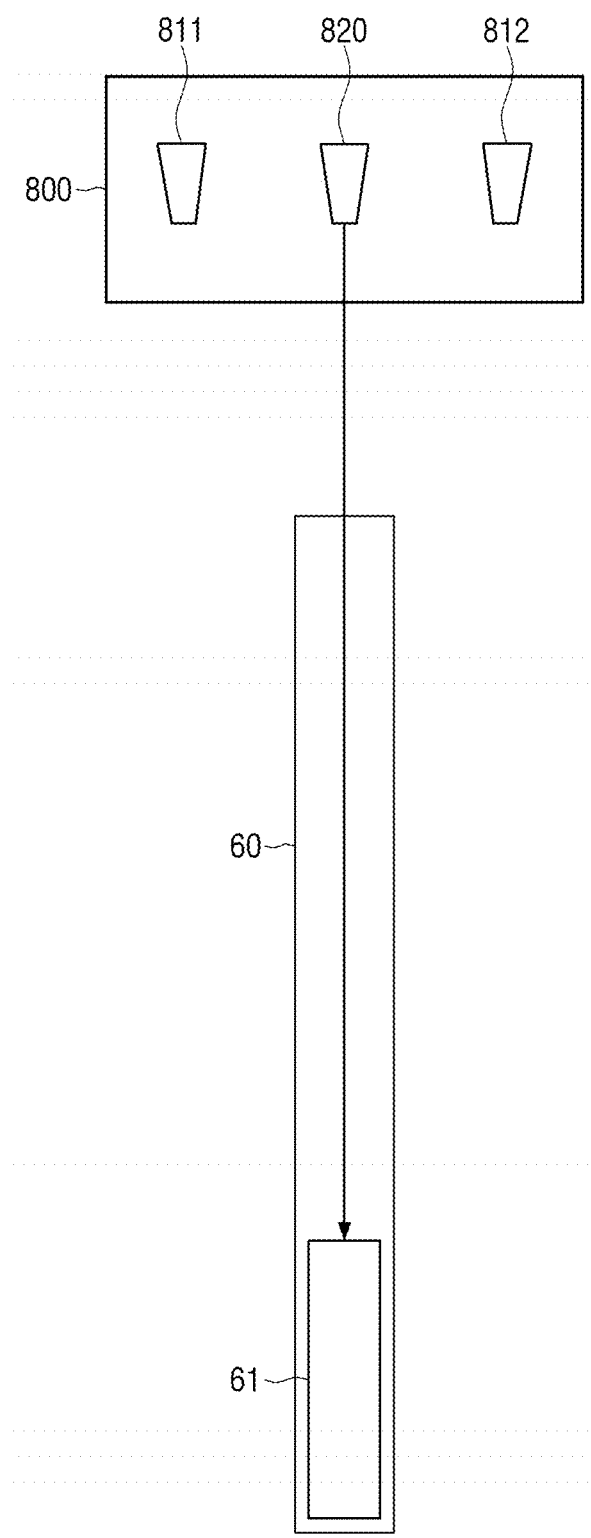
FIG. 26 shows a road surface pattern formed by the auxiliary transmission aperture.
Figure 27:
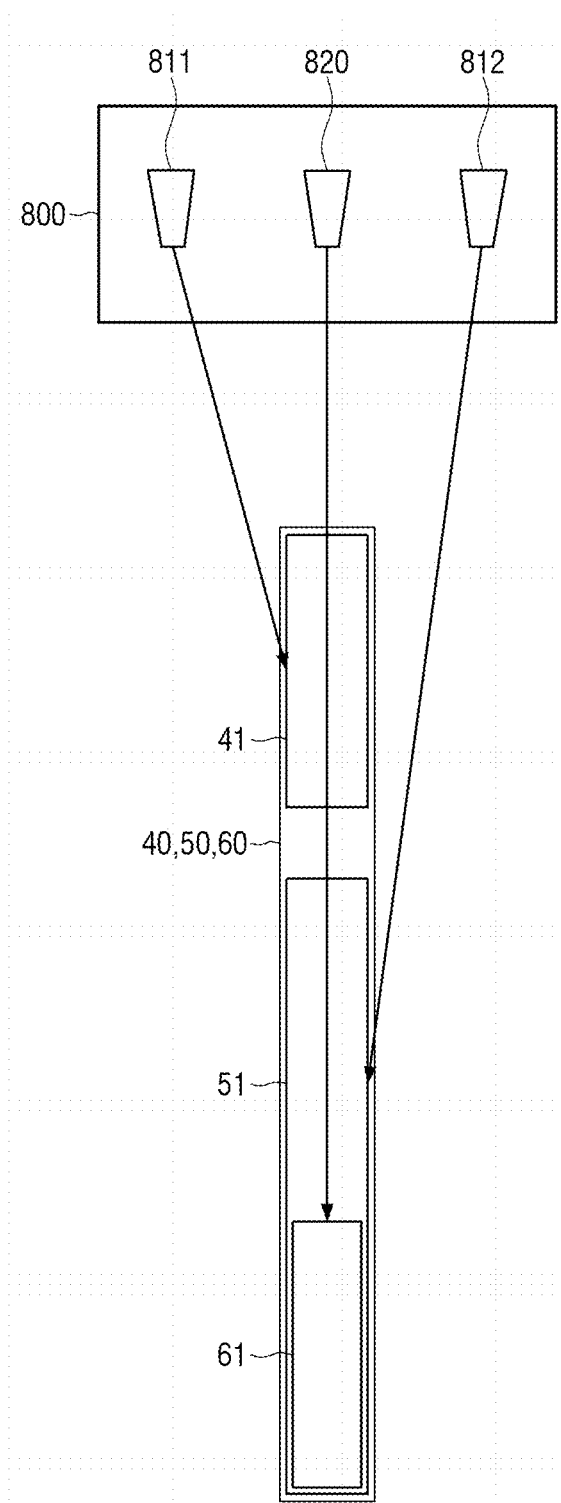
FIG. 27 shows a road surface pattern formed by the main transmission aperture and the auxiliary transmission aperture.

FIG. 24 shows a road surface pattern that is formed by the first main transmission aperture, FIG. 25 shows a road surface pattern that is formed by the second main transmission aperture, FIG. 26 shows a road surface pattern that is formed by the auxiliary transmission aperture, and FIG. 27 shows the road surface pattern that is collectively formed by the main transmission apertures and the auxiliary transmission aperture.

Referring to FIGS. 24 to 27, the shield unit 800 may include main transmission apertures 811 and 812 and auxiliary transmission apertures 820. Herein, although two main transmission apertures and one auxiliary transmission aperture are shown as an example, the present disclosure is not limited thereto. The numbers of the main transmission apertures and the auxiliary transmission apertures may be varied as necessary.

The main transmission apertures 811 and 812 may include a first main transmission aperture 811 and a second main transmission aperture 812. The first main transmission aperture 811 may form a first road surface pattern 40, which includes a first concentrated region 41. More specifically, the light transmitted through the first main transmission aperture 811 may form the first road surface pattern 40 that is elongated in the traveling direction of the light. Within the first road surface pattern 40, the first concentrated region 41 in which light is more concentrated than other regions may be formed at the proximate side of the first road surface pattern 40 from the vehicle lamp 600.

The second main transmission aperture 812 may form a second road surface pattern 50, which includes a second concentrated region 51. The light transmitted through the second main transmission aperture 812 may form the second road surface pattern 50 that is elongated in the traveling direction of the light. Within the second road surface pattern 50, the second concentrated region 51 in which light is more concentrated than other regions may be formed at the distal side of the second road surface pattern 50 from the vehicle lamp 600. Here, the second concentrated region 51 may be formed farther from the vehicle lamp 600 than the first concentrated region 41.

Further, the auxiliary transmission aperture 820 may form a third road surface pattern 60, which includes an auxiliary concentrated region 61. The auxiliary concentrated region 61 where light is concentrated by the auxiliary transmission aperture 820 may be formed at the distal side of the second concentrated region 51, which is formed by the second main transmission aperture 812.

The length of the second concentrated region 51 that is formed by the second main transmission aperture 812 may be greater than the length of the first concentrated region 41 that is formed by the first main transmission aperture 811. In particular, the second concentrated region 51 may be formed at a position more distant from the vehicle lamp 600 than the first concentrated region 41. Accordingly, a portion of the second concentrated region 51 that is far from the vehicle lamp 600 may have lower brightness than other portions because light is not sufficiently irradiated.

The auxiliary concentrated region 61 that is formed by the auxiliary transmission aperture 820 may be formed a the portion of the second concentrated region 51 that has a relatively low brightness. Accordingly, as the first, second, and third road surface patterns 40, 50, and 60 are superimposed, the first concentrated region 41, the second concentrated region 51, and the auxiliary concentrated region 61 may be observed with substantially uniform brightness.

In concluding the detailed description, those skilled in the art will appreciate that variations and modifications can be made to the exemplary embodiments described above without departing from the principles of the present disclosure. Therefore, the exemplary embodiments of the disclosure should be used in a generic and descriptive sense only and not to limit the scope of the present disclosure.

What is claimed is:
1. A lamp for vehicle, comprising:
a light source unit that generates light;
a shield unit that selectively transmits a portion of the light generated from the light source unit; and
a lens unit that concentrates the light transmitted through the shield unit on a road surface,
wherein the shield unit includes a substantially flat surface and a plurality of protrusion members formed to protrude from the surface, and
wherein the plurality of protrusion members are protruded to a substantially same height above the surface.

2. The lamp for vehicle of claim 1, wherein the plurality of protrusion members include at least one protrusion member protruded from a curvilinear base shape having a predetermined width and elongated across the surface of the shield unit, and
    wherein the at least one protrusion member has a substantially constant protrusion length from the surface of the shield unit.

3. The lamp for vehicle of claim 1, wherein the shield unit is made of a glass material.

4. A lamp for vehicle, comprising:
    a light source unit that generates light;
    a shield unit that selectively transmits a portion of the light generated from the light source unit; and
    a lens unit that concentrates the light transmitted through the shield unit on a road surface,
    wherein a main transmitted light among the light transmitted through the shield unit forms a plurality of road surface patterns, and
    wherein an auxiliary transmitted light among the light transmitted through the shield unit is irradiated to at least one selected road surface pattern among the plurality of road surface patterns to enhance a brightness of the light in the selected road surface pattern.

5. The lamp for vehicle of claim 1, wherein the lens unit includes a convex lens and a concave lens disposed axially, and
    wherein the convex lens and the concave lens have different refractive indices.

6. The lamp for vehicle of claim 5, wherein light transmitted through the shield unit passes through the convex lens after passing through the concave lens.

7. The lamp for vehicle of claim 5, wherein a refractive index of the concave lens is greater than a refractive index of the convex lens.

8. The lamp for vehicle of claim 5, wherein the convex lens is made of poly methyl methacrylate (PMMA), and the concave lens is made of poly carbonate (PC).

9. The lamp for vehicle of claim 1, wherein the light source unit, the shield unit, and the lens unit are arranged to be inclined with respect to the road surface.

10. The lamp for vehicle of claim 4, wherein the shield unit comprises:
    at least one main transmission aperture for forming the main transmitted light; and
    at least one auxiliary transmission aperture for forming the auxiliary transmitted light.

11. The lamp for vehicle of claim 10, wherein the at least one main transmission aperture includes a plurality of main transmission apertures,
    wherein the plurality of main transmission apertures are arranged at different heights with respect to the road surface, and
    wherein a shape and/or a size of each of the plurality of main transmission apertures are determined to allow the plurality of road surface patterns to have substantially same shape and size.

12. The lamp for vehicle of claim 11, wherein some of the plurality of main transmission apertures are arranged linearly along an imaginary line, and
    wherein at least some of the plurality of main transmission apertures are arranged to be separated from the imaginary line.

13. The lamp for vehicle of claim 12, wherein a main transmission aperture having a largest size among the plurality of main transmission apertures is arranged to be separated from the imaginary line.

14. The lamp for vehicle of claim 10, wherein the light source unit comprises:
    a main light source unit corresponding to the main transmission aperture; and
    an auxiliary light source unit corresponding to the auxiliary transmission aperture.

15. The lamp for vehicle of claim 14, wherein each of the main light source unit and the auxiliary light source unit comprises:
    a light source that generates the light; and
    an optical unit that allows the light of the light source to be irradiated with straightness in one direction,
    wherein the optical unit has a size corresponding to a size of a corresponding main transmission aperture or a corresponding auxiliary transmission aperture.

16. The lamp for vehicle of claim 4, wherein the auxiliary transmitted light is irradiated to a road surface pattern among the plurality of road surface patterns, which has a lower brightness than adjacent road surface patterns without the auxiliary transmitted light.

17. A lamp for vehicle, comprising:
    a light source unit that generates light;
    a shield unit that selectively transmits a portion of the light generated from the light source unit; and
    a lens unit that concentrates the light transmitted through the shield unit on a road surface,
    wherein a main transmitted light among the light transmitted through the shield unit forms a plurality of road surface patterns, in which the light is concentrated on different regions, and
    wherein an auxiliary transmitted light among the light transmitted through the shield unit is irradiated to concentrate the light to at least one selected region among the plurality of road surface patterns to enhance a brightness of the selected region.

18. The lamp for vehicle of claim 17, wherein the shield unit comprises:
    a main transmission aperture for forming the main transmitted light; and
    an auxiliary transmission aperture for forming the auxiliary transmitted light,
    wherein the main transmission aperture and the auxiliary transmission aperture have substantially same shape and size and are arranged linearly along an imaginary line.

19. The lamp for vehicle of claim 18, wherein the light source unit comprises:
    a main light source unit corresponding to the main transmission aperture; and
    an auxiliary light source unit corresponding to the auxiliary transmission aperture,
    wherein heights and/or sizes of the main light source unit and the auxiliary light source unit are determined to allow the light to be concentrated at a particular region with a particular size by a corresponding transmission aperture among the main transmission aperture and the auxiliary transmission aperture.

* * * * *